US00RE41265E

(19) United States
(12) Reissued Patent
Perra et al.

(10) Patent Number: US RE41,265 E
(45) Date of Reissued Patent: Apr. 27, 2010

(54) DEPTH OF DRIVE ADJUSTMENT FOR A FASTENER DRIVING TOOL WITH REMOVABLE CONTACT MEMBER AND METHOD OF EXCHANGING CONTACT MEMBERS

(75) Inventors: Arthur E. Perra, Hope Valley, RI (US); Prudencio S. Canlas, Jr., North Kingstown, RI (US); David J. Simonelli, Coventry, RI (US); David M. McGee, Attleboro, MA (US)

(73) Assignee: Stanley Fastening Systems, L.P., East Greenwich, RI (US)

(21) Appl. No.: 11/511,534

(22) Filed: Aug. 29, 2006

Related U.S. Patent Documents

Reissue of:
(64) Patent No.: 6,783,044
Issued: Aug. 31, 2004
Appl. No.: 10/358,374
Filed: Feb. 5, 2003

(51) Int. Cl.
*B25C 1/04* (2006.01)

(52) U.S. Cl. ..... 227/8; 227/142
(58) Field of Classification Search ..... 227/8, 227/120, 130, 142
See application file for complete search history.

(56) References Cited

U.S. PATENT DOCUMENTS

| | | | | |
|---|---|---|---|---|
| 3,519,186 | A | 7/1970 | Volkmann | |
| 3,708,096 | A | 1/1973 | Burke, Jr. | |
| 4,197,974 | A | 4/1980 | Morton et al. | |
| 4,597,517 | A | 7/1986 | Wagdy | |
| 4,767,043 | A | 8/1988 | Canlas, Jr. | |
| 4,821,937 | A | 4/1989 | Rafferty | |
| 5,219,110 | A | 6/1993 | Mukoyama | |
| 5,261,587 | A | 11/1993 | Robinson | |
| 5,263,626 | A | 11/1993 | Howard et al. | |
| 5,263,842 | A | 11/1993 | Fealey | |
| 5,385,286 | A | 1/1995 | Johnson, Jr. | |
| 5,452,835 | A | 9/1995 | Shkolnikov | |
| 5,564,614 | A | 10/1996 | Yang | |
| 5,579,977 | A | 12/1996 | Yang | |
| 5,593,079 | A | 1/1997 | Mukoyama et al. | |
| 5,667,127 | A | 9/1997 | Ichikawa et al. | |
| 5,685,473 | A | 11/1997 | Shkolnikov et al. | |
| 5,715,982 | A | 2/1998 | Adachi | |
| 5,785,227 | A | 7/1998 | Akiba | |
| 5,816,468 | A | 10/1998 | Yang | |
| 5,839,638 | A | 11/1998 | Ronn | |
| 6,209,770 | B1 | 4/2001 | Perra | |
| 6,279,808 | B1 | 8/2001 | Larsen | |
| 6,557,745 | B2 | 5/2003 | Wang | |
| 6,581,815 | B1 | 6/2003 | Ho et al. | |
| 6,705,501 | B2 * | 3/2004 | Miller et al. | 227/8 |

OTHER PUBLICATIONS

International Search Report dated Jul. 21, 2004.

* cited by examiner

*Primary Examiner*—Scott A. Smith
(74) *Attorney, Agent, or Firm*—Pillsbury Winthrop Shaw Pittman LLP

(57) ABSTRACT

A fastener driving tool includes a housing assembly with a nosepiece assembly defining a drive track. A safety trip assembly includes a trigger enabling portion and a workpiece engaging portion and is movable between an extended disabling position and a retracted enabling position. The safety trip assembly is biased toward the extended position and is moved toward the retracted position by engagement between a workpiece and the workpiece engaging member. The workpiece engaging portion is movable to permit adjustment of a length of the safety trip assembly. The workpiece engaging portion may be removed from the safety trip assembly and exchanged with another different workpiece engaging portion. A workpiece engaging portion usable with the fastener driving tool includes a positioning mechanism having an opening locating structure and a guiding structure.

23 Claims, 10 Drawing Sheets

DEPTH OF DRIVE ADJUSTMENT FOR A FASTENER DRIVING TOOL WITH REMOVABLE CONTACT MEMBER AND METHOD OF EXCHANGING CONTACT MEMBERS

Matter enclosed in heavy brackets [ ] appears in the original patent but forms no part of this reissue specification; matter printed in italics indicates the additions made by reissue.

BACKGROUND OF THE INVENTION

Power operated fastener driving devices are in widespread use in the construction and building trades and typically include a power operated driving mechanism mounted within a housing that powers the driving movement of a drive element slidably mounted within a drive track that extends through a nose piece mounted to the housing. Typically when the driving mechanism is actuated, the drive element moves in a fastener driving direction through a drive stroke and then moves in the opposite direction through a return stroke during one cycle of operation. A trigger mechanism that is movable through an actuation stroke is commonly provided on the exterior of the housing to initiate an operating cycle.

A magazine assembly mounted to the housing supplies a series of fasteners to the drive track through a lateral opening in the same and the leading fastener in the drive track is driven outwardly of the drive track into a workpiece by the driving movement of the drive element when the driving mechanism is actuated. Typically a spring biased fastener feeding device advances the fasteners through the magazine toward and into the drive track.

Power operated fastener driving devices typically include a trip assembly mounted on the nosepiece and operatively associated with the trigger mechanism to prevent the driving mechanism from being actuated when the nosepiece is not in contact with a workpiece.

Often the trip assemblies of fastener driving devices include adjustable mechanisms that can be adjusted manually to control the depth to which a fastener is driven into the workpiece. A safety trip assembly including a manual adjustment mechanism is disclosed in U.S. Pat. No. 6,209,770.

Referring to FIG. 12, workpiece engaging portion 64A of the safety trip assembly 60A according to the prior art has a distal end 78A, a proximal end 88A, and a fixed locking structure 70A between the ends 78A and 88A. A movable locking member 74A releasably engages the fixed locking structure 70A to retain the workpiece engaging portion at a desired position of extension. A retaining projection 89A is integrally cast on the workpiece engaging portion 64A near the distal end 88A. The retaining projection 89A engages the movable locking member 74A at a fully extended position of the workpiece engaging portion 64A to define a maximum longitudinal length of the safety trip assembly 60A (as defined by the position of the workpiece engaging portion 64A). The safety trip assembly 60A is biased toward and into an extended position by a spring 101A. The retaining projection 89A prevents removal of the workpiece engaging portion 64A from the safety trip assembly 60A. The retaining projection 89A also prevents the workpiece engaging portion 64A from falling or dropping out of the safety trip assembly if the movable locking member 74A is depressed so that it is released from locking engagement relation with the fixed locking structure 70A and held in such relation while the fastener driving tool is in a position with the nosepiece assembly facing down. As a result, heretofore the movable workpiece engaging portion of the prior art discussed above is a permanent part of the safety trip assembly.

While the prior art described above has worked extremely well for its intended use, more recently a need has developed for a more flexible and modular tool.

SUMMARY OF THE INVENTION

The present invention provides a safety trip assembly that includes a workpiece engaging portion that can be moved in the longitudinal direction of the safety trip assembly to adjust the longitudinal length of the safety trip assembly and also to remove the workpiece engaging portion from the safety trip assembly for exchanging the workpiece engaging portion with another workpiece engaging member.

According to one aspect of the invention, a fastener driving tool for driving fasteners into a workpiece includes a housing assembly including a nosepiece assembly defining a longitudinally-extending fastener drive track. A fastener driving mechanism is carried internally of the housing assembly and constructed and arranged to drive a fastener through the fastener drive track and into a workpiece when the fastener drive mechanism is selectively activated by a user. A manually actuatable trigger mechanism is constructed and arranged to activate the fastener driving mechanism when manually actuated by a user.

A safety trip assembly includes a trigger enabling portion and a workpiece engaging portion slidably mounted to the trigger enabling portion for rectilinear sliding movement in a longitudinal direction relative to the trigger enabling portion. A manually operable locking mechanism includes a manually-operable, movable locking member mounted to the trigger enabling portion for movement between a locking position and a releasing position, the movable locking member in the locking position thereof engaging the workpiece engaging portion to releasably couple the workpiece engaging portion to the trigger enabling portion and thereby fix a longitudinal length of the safety trip assembly, the movable locking member in the releasing position thereof being disengaged from the workpiece engaging portion to enable the workpiece engaging portion to be slid rectilinearly in the longitudinal direction relative to the trigger enabling portion for adjusting the longitudinal length of the safety trip assembly and for removing the workpiece engaging portion from the safety trip assembly.

A spring biases the movable locking member into the locking position, the spring permitting the movable locking member to be manually moved to the releasing position against the biasing force by a user's hand engaging the movable locking member to move the movable locking member from the locking position to the releasing position and to automatically return to the locking position when the movable locking member is disengaged by the user's hand.

According to another aspect of the invention, the workpiece engaging portion is removable from the safety trip assembly. A workpiece engaging portion according to this aspect of the invention includes a positioning mechanism having an opening locating structure and a guiding structure. The opening locating structure is movably connected to the safety trip assembly and is adapted to extend into the opening to align the nosepiece assembly with respect to the opening. The opening locating structure is movable relative to the safety trip assembly between an extended position by a first biasing spring to facilitate locating of the opening, and movable to a retracted position when the opening locating structure is pressed against the workpiece. The guiding structure is movably connected to the nosepiece assembly and is biased by a second spring to extend forwardly to guide the fastener in the drive track.

In accordance with another aspect of the invention, a method is provided for exchanging different workpiece engaging portions of a safety trip assembly in a fastener driving tool for driving fasteners into a workpiece, the safety trip assembly including a trigger enabling portion and a workpiece engaging portion, the workpiece engaging portion slidably mounted to the trigger enabling portion for movement in a longitudinal direction relative to the trigger enabling portion, the safety trip assembly being movable when the workpiece engaging portion is releasably coupled to the trigger enabling portion between an extended position and a retracted position whereby the trigger enabling portion enables the trigger mechanism to activate the fastener driving mechanism when manually actuated by a user when the safety trip assembly is in the retracted position and disables the trigger mechanism when the safety trip assembly is not in the retracted position.

The method includes manually engaging and moving a manually-operated, movable locking member mounted to the trigger enabling portion against a biasing of a spring from a locking position wherein the locking mechanism lockingly engages a first workpiece engaging portion to releasably couple the first workpiece engaging portion to the trigger enabling portion to a releasing position wherein the locking member is disengaged from the first workpiece engaging portion. While the locking member is in the releasing position thereof, the first workpiece engaging portion is moved relative to the trigger enabling portion until the first workpiece engaging portion is removed from the safety trip assembly, and a second workpiece engaging portion different from the first workpiece engaging portion is moved relative to the trigger enabling portion so that the second workpiece engaging portion is mounted to the trigger enabling portion. The locking member is manually released to allow the spring to bias the movable locking member from the releasing position back into the locking position to thereby lockingly engage the second workpiece engaging portion.

Other aspects of the invention will be appreciated from the following description and appended claims.

DETAILED DESCRIPTION

Figure 1:
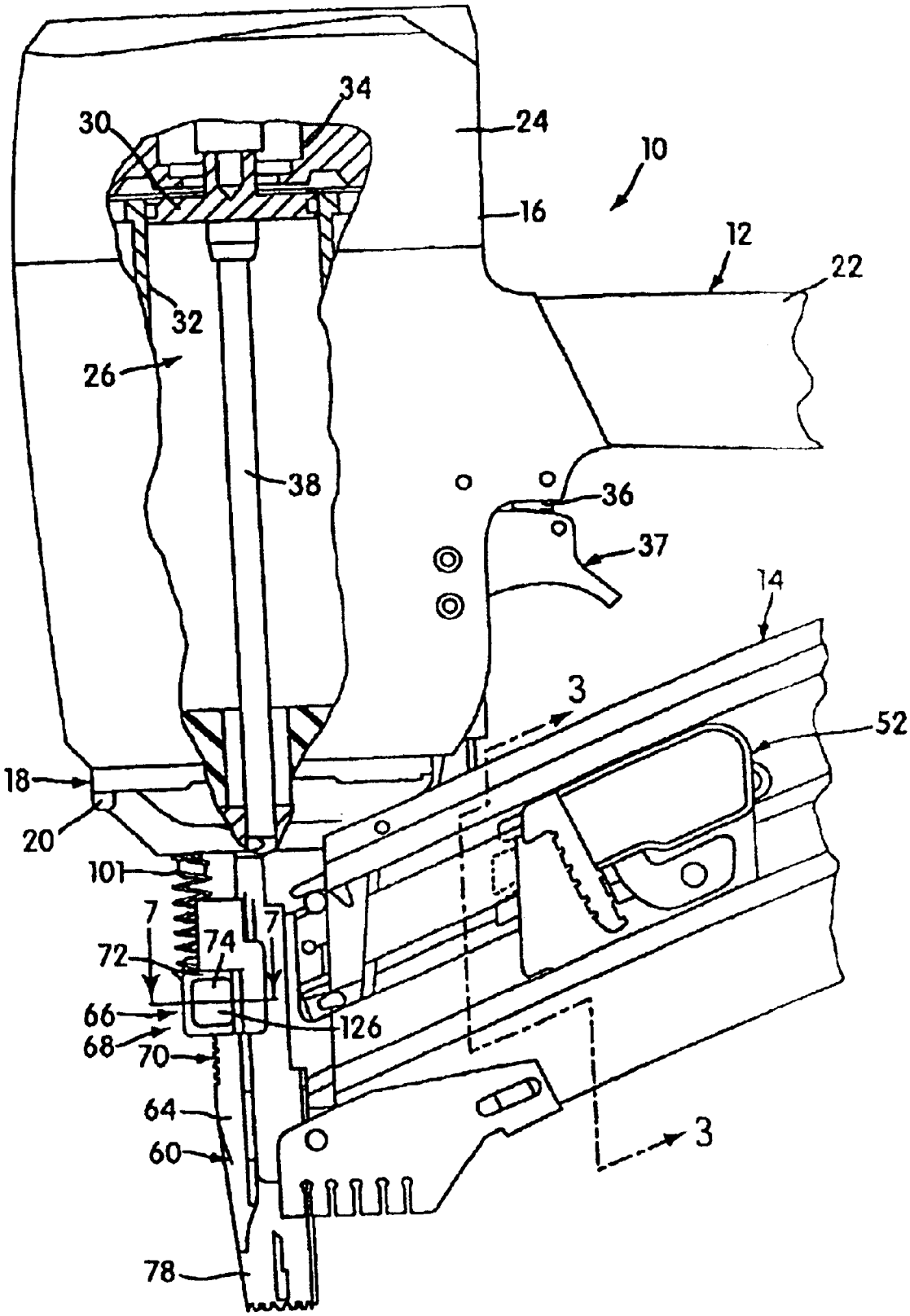
FIG. 1 is a fragmentary side elevational view of a fastener driving device constructed according to the principles of the present invention showing a portion of a housing assembly broken away to show a fastener driving mechanism of the device.

FIG. 1 shows a portable power operated fastener driving tool 10 according to the present invention. The fastener driving tool 10 includes a housing assembly 12 and a fastener magazine assembly 14. The housing assembly 12 includes a housing structure 16 which may be of conventional construction and a nosepiece assembly 18 secured thereto by conventional fasteners 20.

The housing structure 16 includes a hollow handle grip portion 22, the interior of which forms a reservoir for pressurized air supplied by a conventional pressurized air source (not shown) in communication therewith. The grip portion 22 is integrally formed with a vertically extending portion 24 of the housing structure 16 which contains a fastener driving mechanism 26 of conventional construction. A portion of the housing structure 16 has been broken away in FIG. 1 to show the construction of the fastener driving mechanism 26.

The fastener driving mechanism 26 is constructed and arranged to drive a fastener through a longitudinally extending fastener driving track 28 (best seen in the cross-sectional view of FIG. 2) outwardly into a workpiece when the fastener driving mechanism 26 is selectively actuated by a worker using the fastener driving tool 10.

The fastener driving mechanism 26 includes a piston 30 mounted within a cylindrical chamber 32 in the housing structure 16 for movement from an upper position (shown in FIG. 1) through a drive stroke into a lowermost position and from the lowermost position through a return stroke back to the upper limiting position. A main valve 34 controls the flow of pressurized air from the reservoir in the handle grip portion 22 to the upper end of the cylindrical chamber 32 to affect the driving movement of the piston 30 through its drive stroke.

The main valve 34 is pilot pressure operated and the pilot pressure chamber thereof is under the control of an actuating valve 36. The main valve 34 and actuating valve 36 may be of known construction, an example of which is disclosed in commonly assigned U.S. Pat. No. 3,708,096, incorporated herein by reference. The construction and operation of the fastener driving mechanism 26 is disclosed in commonly assigned U.S. Pat. No. 5,263,842, incorporated herein by reference. The main features of the fastener driving mechanism 26 will be identified, however, so the present invention may be better understood. The fastener driving mechanism described herein is exemplary only and is not intended to be limiting. In is understood that the present invention can be used on a power operated fastener driving device having a fastener driving mechanism of any conventional construction and is not limited to the representative embodiment disclosed in the present application. It can also be understood that the present invention is not limited to pneumatically operated fastener driving devices and can be incorporated in fastener driving devices that are powered by any conventional power source including internal combustion powered devices and electromagnetically powered devices. The actuating valve 36 is actuated by a trigger mechanism 37. The structure and operation of the trigger mechanism 37 is described in detail in the '842 patent. The structure and operation of the trigger mechanism is discussed below in relation to the operation of the present invention.

Means are provided within the housing structure 16 to affect the return stroke of the piston 30. For example, such means may be in the form of a conventional plenum chamber return system such as that disclosed in the 096 patent.

A fastener driving element 38 is suitably connected to the piston 30 and is slidably mounted within the fastener driving track 28 formed in the nosepiece assembly 18. The fastener magazine assembly 14 is operable to receive a supply of fasteners 40 at a first end (not shown) and to feed the leading fastener out a second end 44 thereof through a lateral opening 46 (best seen in the cross-section of FIG. 2) in the nosepiece assembly 18 into the fastener driving track 28 to be driven therefrom by the fastener driving element 38 in a conventional manner.

Figure 2:
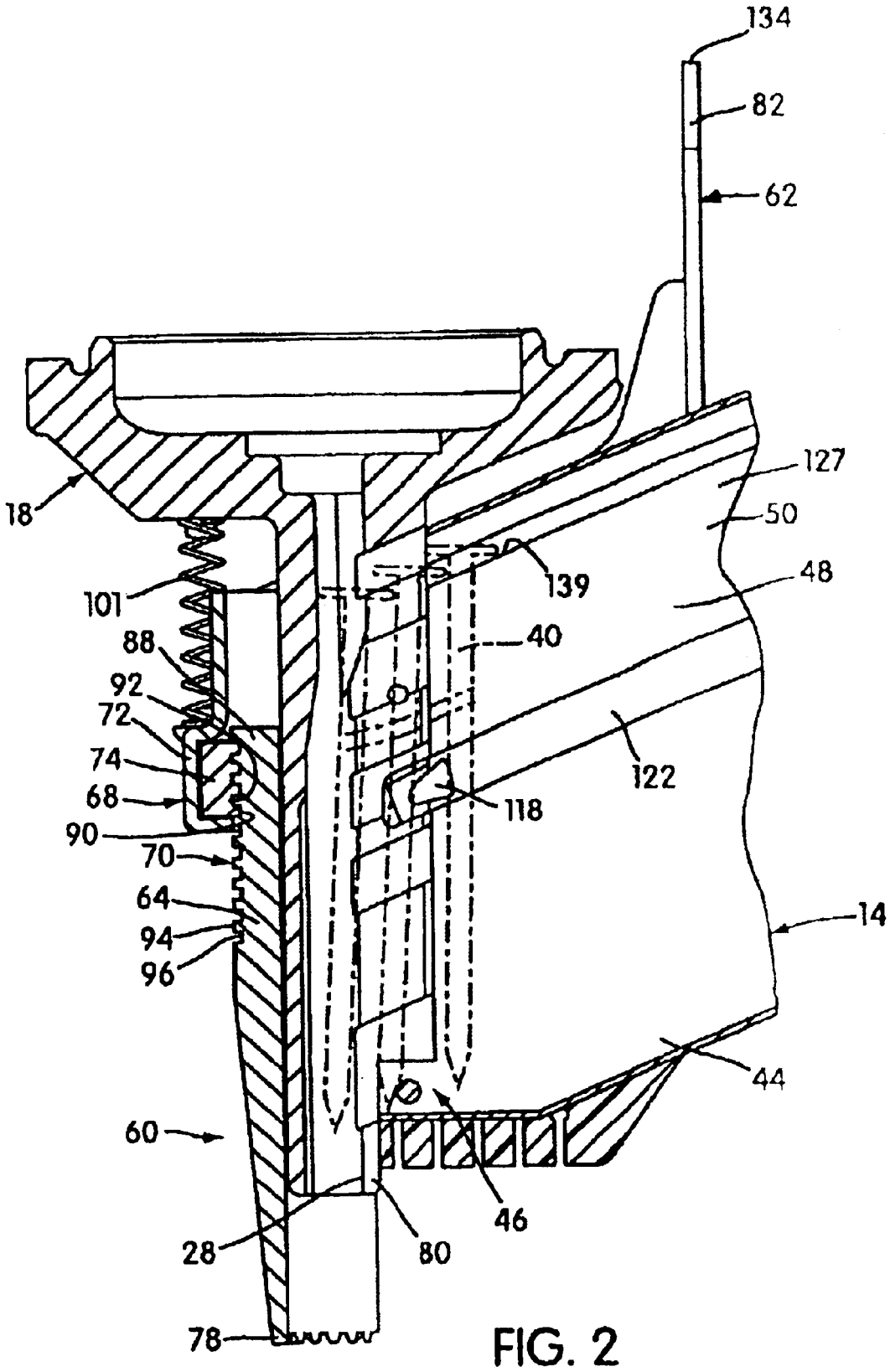
FIG. 2 is a cross-sectional view of a nosepiece assembly, a safety trip assembly and a fragment of a fastener magazine assembly of the fastener driving device and showing a plurality of fastener in phantom.
Figure 3:
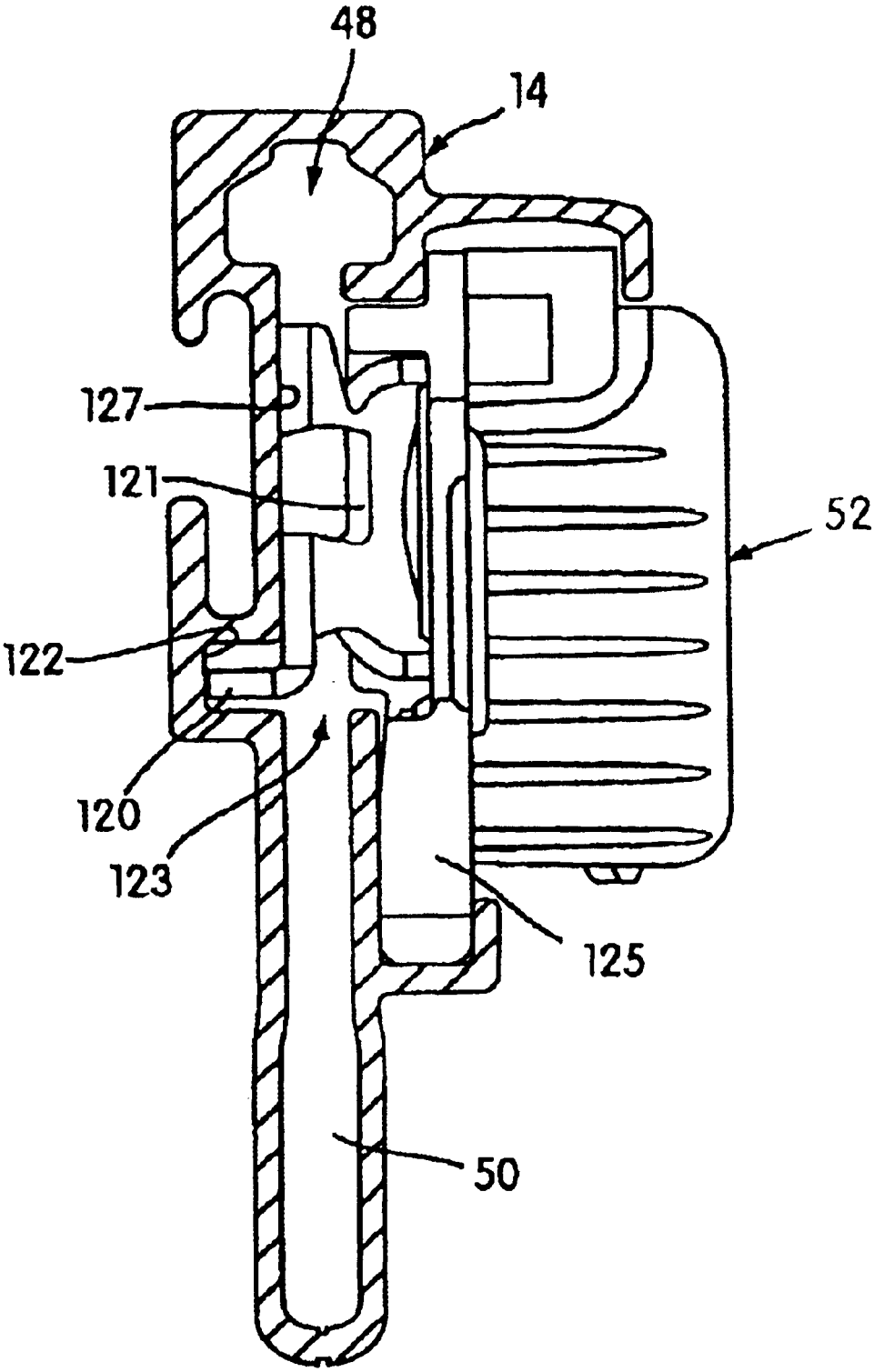
FIG. 3 is a cross-sectional view of the fastener magazine assembly taken through the line 3—3 in FIG. 1.
Figure 4:
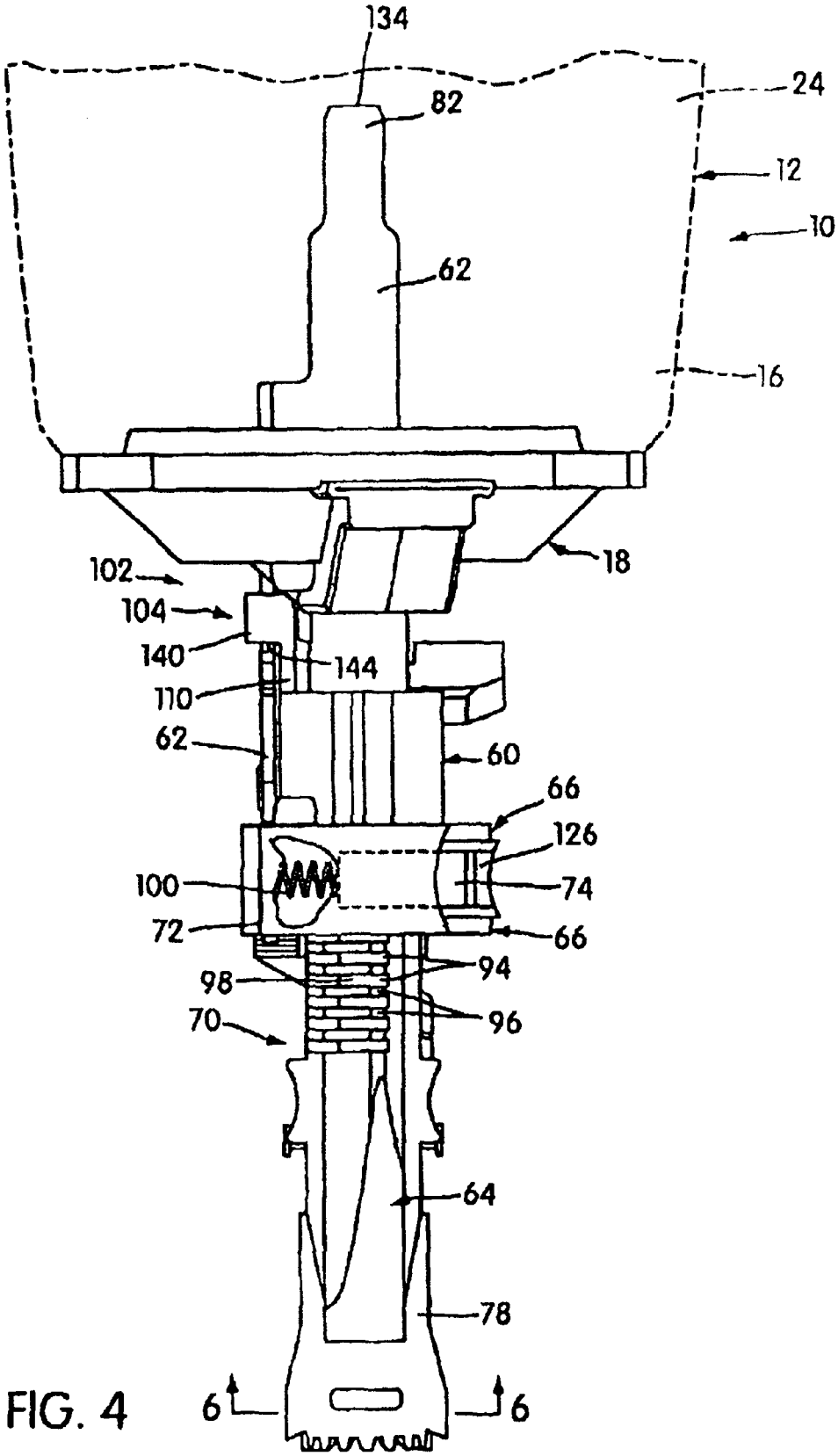
FIG. 4 is a front elevational view of the nosepiece assembly, the safety trip assembly and a trip locking mechanism constructed according to the principles of the present invention and showing a fragment of a housing structure of the fastener driving device in phantom.
Figure 5:
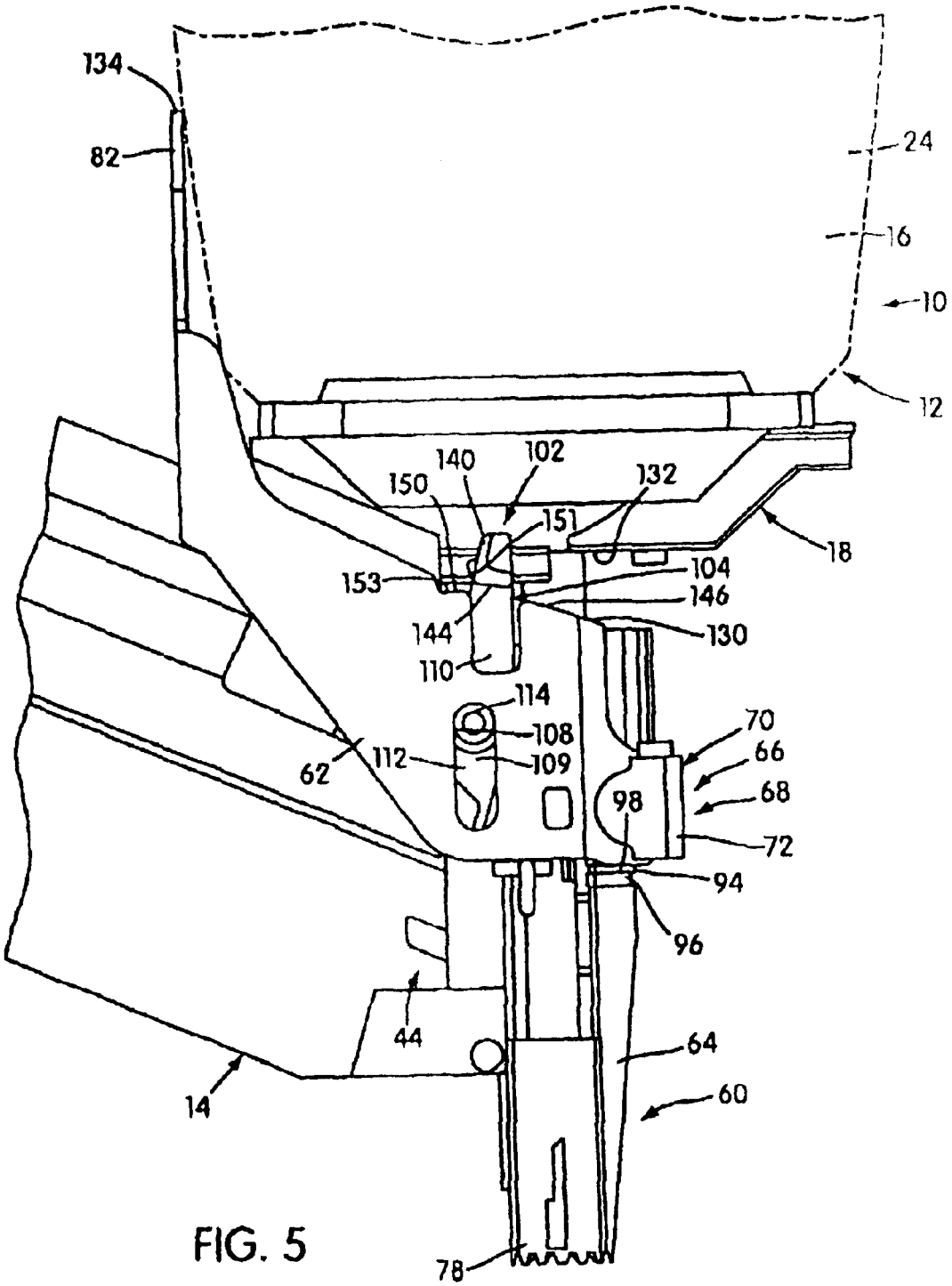
FIG. 5 is a side elevational view of the fastener driving device similar to the view of FIG. 1 except showing an opposite side of the device and showing a fragmentary of the housing structure in phantom.

The manner in which the fasteners 40 are supplied to the drive track 28 is conventional and is best appreciated from the cross-sectional view of FIG. 2 and the structure of the fastener magazine assembly 14 is best appreciated from the cross-sectional view of the same shown in FIG. 3.

The fastener magazine assembly 14 includes an inner portion 48 that defines a fastener supply channel 50 that is in communication with the lateral opening 46. The fastener magazine assembly 14 is constructed and arranged to hold a supply fasteners 40 within the fastener supply channel 50 in an operative orientation for feeding the fasteners 40 from the fastener supply channel 50 through the lateral opening 46 and into the fastener driving track 28. A fastener feeding mechanism 52 is provided as part of the fastener magazine assembly 14. The fastener feeding mechanism 52 is spring biased in a conventional manner to move toward the second end of the magazine assembly so that when the mechanism 52 is positioned behind a supply of fasteners 40 disposed within the supply channel 50 the fastener feeding mechanism 52 biasingly engages the same to urge the fasteners 40 toward and into the fastener driving track 28 in a well known manner.

The present invention is not primarily concerned with the structure and operation of the fastener driving mechanism 26, with the structure of the housing assembly 12 or with the structure of the nosepiece assembly 18, all of which may be conventional. The focus of the present invention is, rather, the structure and operation of a safety trip assembly that acts as a safety to prevent the fastener driving mechanism 26 from being actuated until the nosepiece assembly 18 is pressed against a workpiece and the manner in which the safety trip assembly functions to control the depth to which a fastener is driven into the workpiece.

The structure of the safety trip assembly 60 is best appreciated from FIGS. 2 and 4–7. The safety trip assembly 60 includes a trigger enabling portion 62 and a workpiece engaging portion 64 that is releasably coupled to the trigger enabling portion 62 by a releasable coupling mechanism 66. The safety trip assembly 60 is coupled to the housing assembly 12 for longitudinal movement with respect to the nosepiece assembly 18 between an extended position and a retracted position. When the safety trip assembly 60 is in the retracted position, the trigger enabling portion 62 conditions the trigger mechanism 37 and places it in an active state or condition so that manual movement of the trigger mechanism 37 thereafter through its actuation stroke will actuate the fastener driving mechanism 26. When the safety trip assembly 60 is in the extended position, the trigger enabling portion 62 disables the trigger mechanism 37 to prevent the fastener driving tool 10 from being accidentally actuated if the trigger mechanism is moved through its actuation stroke.

The releasable coupling mechanism 66 allows the workpiece engaging portion 64 to be uncoupled from the trigger enabling portion 62 to permit adjustment of the longitudinal length of safety trip assembly 60. The releasable coupling mechanism 66 includes a manually operable locking mechanism 68 that is carried by the trigger enabling portion and a fixed locking structure 70 that is formed on the workpiece engaging portion 64 of the safety trip assembly 60.

The manually operable locking mechanism 68 includes a locking member mounting structure 72 that is rigidly attached to the trigger enabling portion 62 and a manually-operable, movable locking member 74 movably mounted in the locking member mounting structure 72 for movement with respect thereto between a locking position and a releasing position. The locking member mounting structure 72 is positioned adjacent the fixed locking structure 70 on the workpiece engaging portion 64 so that when the movable locking member 74 is in its locking position, it engages the fixed locking structure 70 so that the movable locking member 74 and the fixed locking structure 70 are interlocked to prevent relative movement between the workpiece engaging portion 64 and the trigger enabling portion 62. When the movable locking member 74 is moved to its releasing position, the locking member 74 disengages from and releases the fixed locking structure 70 to permit relative movement between the workpiece engaging portion 64 and the trigger enabling portion 62 of the safety trip assembly 60. As will become apparent, the workpiece engaging portion 64 can be selectively repositioned with respect to the trigger enabling portion 62 of the safety trip assembly 60 to vary the depth to which a fastener is driven.

The manner in which the workpiece engaging portion 64 and the trigger enabling portion 62 of the safety trip assembly 60 are mounted on the nosepiece assembly 18 and the manner in which the movable locking member 74 is releasably engaged with the fixed locking structure 70 on the workpiece engaging portion 64 can best be appreciated from FIGS. 2 and 6–8.

Figure 6:
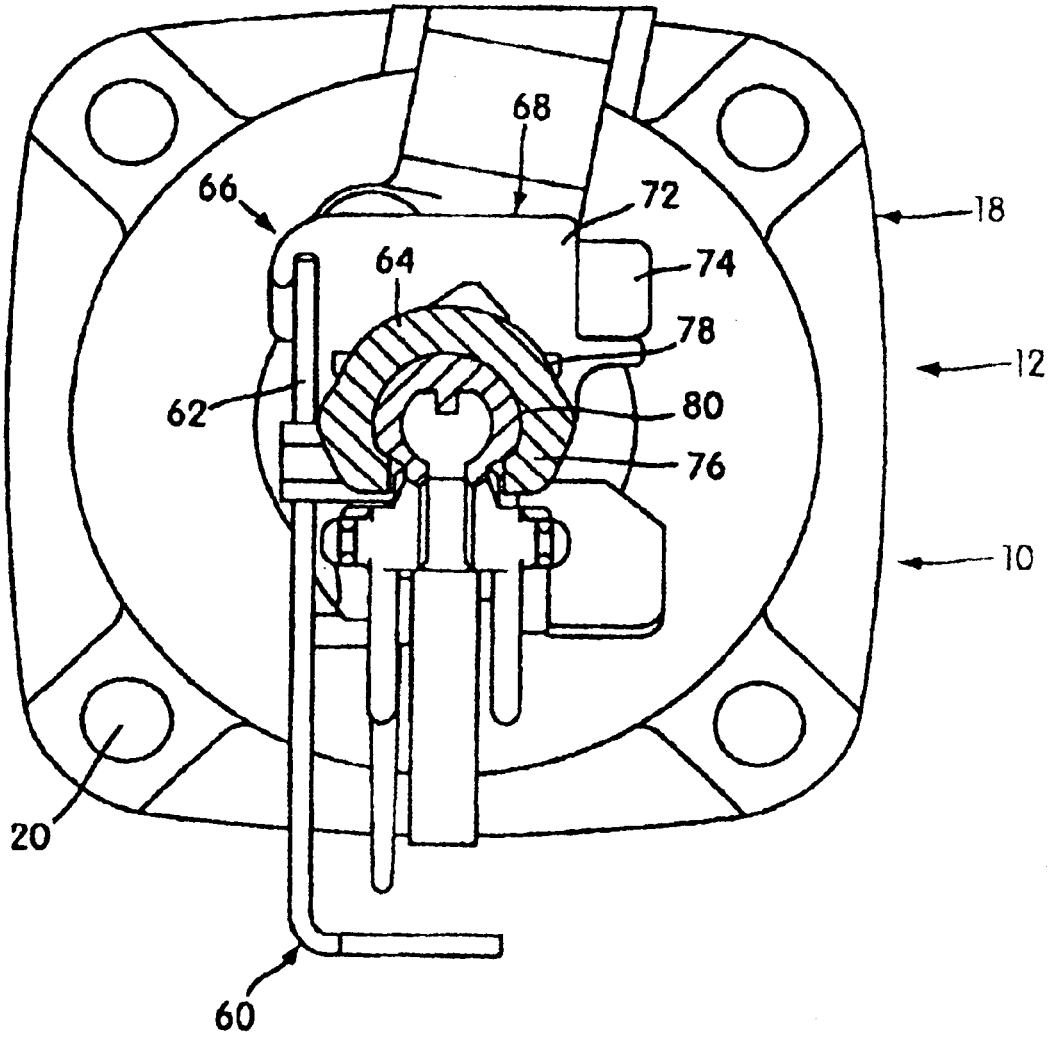
FIG. 6 is a cross-sectional view taken through the line 6—6 of FIG. 4.

The workpiece engaging portion 64 and the trigger enabling portion 62 of the safety trip assembly 60 are each integral structures preferably made of steel or other metal of suitable strength. As shown in FIG. 6, rearwardly extending wall structures 76 integrally formed on a distal end 78 of the workpiece engaging portion 64 partially surround a distal end portion 80 of the nosepiece assembly 18 to movably mount the workpiece engaging portion 64 of the safety trip assembly 60 on the nosepiece assembly 18 to allow longitudinal movement of the workpiece engaging portion 64 with respect to the nosepiece assembly 18 of the housing assembly 12.

The locking member mounting structure 72 is an integral structure preferably made of steel, although other metals of suitable strength could also be used in the construction. A proximal end 82 of the trigger enabling portion 62 is rigidly attached to the locking member mounting structure 72 and the locking member mounting structure 72 is in turn movably coupled to the nosepiece assembly 18 for limited movement in the longitudinal direction of the locking member mounting structure 72 with respect to the nosepiece assembly 18.

Figure 7:
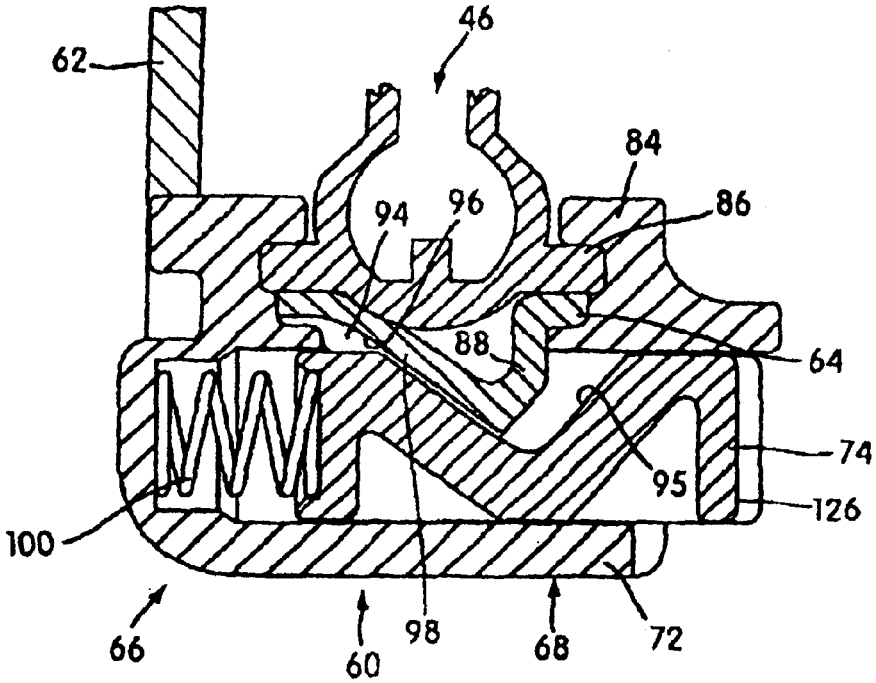
FIG. 7 is a cross-sectional view taken through the line 7—7 of FIG. 1 showing a movable locking member of a releasable coupling mechanism of the safety trip assembly in locking position.
Figure 8:
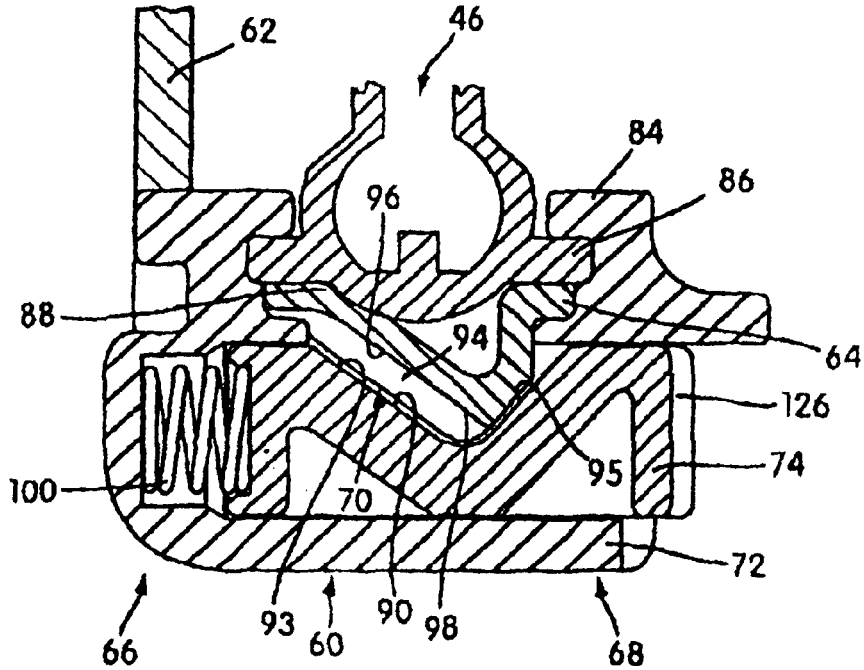
FIG. 8 is a view similar to that of FIG. 7 but showing a movable locking member in a releasing position.
Figure 9:
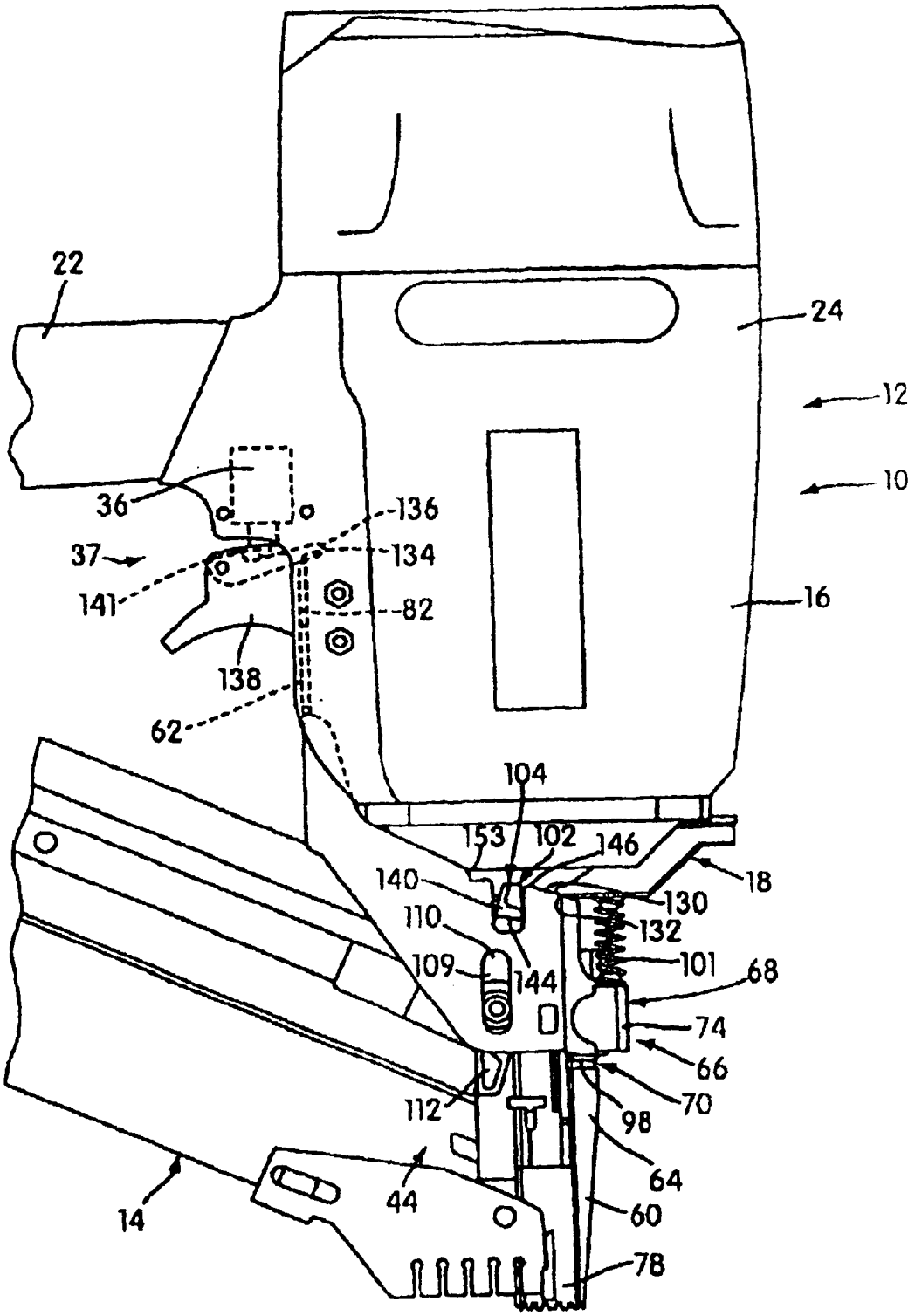
FIG. 9 is a side elevational view similar to FIG. 1 except showing the opposite side of the fastener driving device and showing the safety trip assembly in a retracted position with respect to a housing assembly of the device.

The manner in which the locking member mounting structure 72 is coupled to the nosepiece assembly 18 can be appreciated from FIGS. 7 and 8. More specifically, integral bracket structures 84 on the locking member mounting structure 72 are engaged with integral, longitudinally extending wall portions 86 formed on a central portion of the nosepiece assembly 18. A proximal end 88 of the workpiece engaging portion 64 extends between the locking member mounting structure 72 and the nosepiece assembly 18 in a position to engage the movable locking member 74.

The movable locking member 74 is an integral structure preferably made of steel, although a high strength molded plastic or other material of suitable strength could also be used in the construction. As best appreciated from FIGS. 2 and 7, the movable locking member 74 is provided with a series of continuous transversely extending teeth 90 and grooves 92 provided on angled, longitudinally extending wall portions 93, 95, respectively, of the locking member 74 that engage similarly constructed integral transversely extending teeth 94 and grooves 96 formed on an angled, longitudinally extending wall structure 98 of the workpiece engaging portion 64. It can be appreciated that in the exemplary embodiment of the fastener driving tool 10 shown in the figures, the teeth and grooves 94, 96 on the workpiece engaging portion 64 of the safety trip assembly 60 constitute the fixed locking structure 70 thereof.

The teeth and grooves 90, 92 on the movable locking member 74 are normally biased into releasable locking engagement with the teeth and grooves 94, 96 on the workpiece engaging portion 64 by a locking member biasing mechanism 100 which can be a conventional coil spring as shown in FIGS. 7 and 8. The locking member biasing mechanism 100 biases the movable locking member 74 toward and into its locking position to prevent relative movement between the workpiece engaging portion 64 and the trigger enabling portion 62 of the safety trip assembly 60. The movable locking member 74 and the locking member biasing mechanism 100 are constructed and arranged to permit the user to move the movable locking member 74 manually against the biasing force of the locking member biasing mechanism 100 from the locking position to the releasing position and to allow the movable locking member 74 to return to its locking position under the biasing force when the user releases the movable locking member. As will become apparent, when the movable locking member 74 is in its releasing position, the workpiece engaging portion 64 can be moved longitudinally with respect to the trigger enabling portion 62 to adjust fastener drive depth.

The safety trip assembly 60 is normally biased toward and into its extended position by a conventional coil spring 101 that is mounted between the nosepiece assembly 18 and the locking member mounting structure 72 of the releasable coupling mechanism 66.

The releasable coupling mechanism 66 of the safety trip assembly 60 can be manually adjusted simply and easily without the use of hand tools to control the depth to which the fastener driving device 10 drives a fastener into a workpiece by moving the workpiece engaging portion 64 of the safety trip assembly 60 relative to the trigger enabling portion 62 thereof. To adjust the safety trip assembly 60, the user (with the fastener driving tool 10 preferably disconnected from a source of pressurized air to assure user safety) presses an end portion 126 of the movable locking member 74 with a thumb or finger to move the member 74 from its locking position to its releasing position. While manually holding the movable locking member 74 in its releasing position, the user moves the workpiece engaging portion 64 of the safety trip assembly 60 toward or away from the trigger enabling portion 62 thereof. When the workpiece engaging portion 64 is in the desired position relative to the trigger enabling portion 62, the user releases the movable locking member 74 and allows the locking member biasing mechanism 100 to automatically move the movable locking member 74 toward its locking position. It can be understood that the workpiece engaging portion 64 may have to be moved slightly toward or away from the trigger enabling portion 62 to allow the transversely extending teeth 90 and grooves 92 on the movable locking member 74 to align with the transversely extending teeth 94 and grooves 96 on the workpiece engaging portion 64. It can be appreciated, therefore, that the teeth and grooves 90, 92, 94, 96 cooperate to define a plurality of operative or indexed locking positions of the workpiece engaging portion 64 with respect to the trigger enabling portion 62.

The workpiece engaging portion 64 may optionally be provided with a series of numbered, transversely extending measuring lines that can be aligned with suitable pointing structure on the locking member mounting structure 72 to indicate to the user the depth to which the nail will be driven with respect to the top surface of the workpiece.

The operation of the device 10 to drive a nail is entirely conventional and will be known to those skilled in the art, but will be discussed briefly to help illustrate the operation of the releasable coupling mechanism 66 of the safety trip assembly 60 and the trip lock member 104.

To drive a fastener into a workpiece, the fasteners are first loaded into the fastener magazine assembly 14 in a conventional manner. More specifically, fasteners in, for example, conventional stick form are inserted in the fastener feeding channel 50 from the first end 42 of the magazine behind the fastener feeding mechanism 52. The fastener feeding mechanism 52 is then pulled rearwardly within the magazine toward the first end 42 until it is positioned behind the supply of fasteners 40. With reference to FIG. 3, it can be understood that the fastener feeding mechanism 52 is provided with a feeder mechanism blade 121 and that the blade 121 and leg structure 120 are integral parts of a single pivotable fastener engaging and pushing structure, generally designated 123, that is preferably made of metal and is pivotally mounted on a body portion 125 (preferably made of plastic) of the fastener feeding mechanism 52. The pivotable pushing and engaging structure 123 is spring biased in a conventional manner in a generally transverse direction toward a longitudinally extending wall portion 127 of the fastener magazine assembly but can be pivoted against the spring bias toward the body portion of the fastener feeding mechanism 52 to allow the fastener feeding mechanism 52 to be pulled rearwardly past a package of fasteners 40 in the magazine assembly in a conventional manner to allow the fastener feeding mechanism 52 to be positioned rearwardly of the fasteners while the magazine is being loaded.

When the fastener magazine assembly 14 is loaded, a supply of fasteners is disposed within the fastener supply channel 50 and the fastener feeding mechanism 52 is positioned behind the supply of fasteners to push the same toward the fastener driving track 28. The fastener driving tool 10 is then connected to a source of pressurized air.

The user, holding the tool 10 by the handle grip portion 22 places the workpiece engaging portion 64 of the safety trip assembly 60 on the workpiece at the location where the fastener is to be driven. The user pushes the housing assembly 12 toward the workpiece which causes the safety trip assembly 60 to move from its extended position against the spring bias of the coil spring 101 to its retracted position. The retracted position is realized when an edge portion 130 of the trigger enabling portion 62 contacts and is stopped against a surface 132 on the nosepiece assembly 18. As the trigger enabling portion 62 moves into its retracted position, a free end 134 thereof moves a lever arm 136 pivotally mounted on a trigger member 138 of the trigger mechanism 37 to place the trigger mechanism 37 in an activated condition so that pivotal movement of the trigger member 138 by the user thereafter will depress a valve stem 141 on the actuating valve 36 to actuate the fastener driving mechanism 26 to drive the leading fastener.

It can be appreciated that the fastener driving element 38 is normally in its raised position which allows the leading fastener in the fastener magazine assembly 14 to move through the lateral opening in the nosepiece assembly into the fastener driving track 28. It can also be understood that prior to actuating the fastener driving element 38, the head of the second fastener immediately adjacent the leading fastener is supported by surfaces 139 in the magazine assembly while the head of the leading fastener is unsupported within the fastener driving track 28.

The downward movement of the piston 30 through its drive stroke carries the fastener driving element 38 to its lowermost position. When the fastener driving element 38 is in its lowermost position, the distal end thereof typically extends slightly out of the drive track so the distal driving surface of the driving element 38 is positioned about one quarter inch (typically) beyond the end of the drive track 28 and this defines the point at which the fastener driving element 38 stops driving the fastener 40 toward and into the workpiece. One skilled in the art will understand that the driving element 38 extends beyond the end of the track 28 to compensate for a reaction force that occurs during actuation which tends to move the housing assembly and associated structures away from the workpiece and to provide the ability to countersink the fastener if desired. It will be understood that the distance between the end of the nosepiece assembly 18 (which defines the distal end of the drive track 28) and the surface of the workpiece determines the depth to which a fastener is driven into the workpiece and that the position of the workpiece engaging portion 64 relative to the trigger enabling portion 62 determines this distance.

More specifically, the workpiece engaging portion 64 can be adjusted by appropriate manipulation of the releasable coupling mechanism 66 to position the end of the drive track 28 against the workpiece when the safety trip assembly 60 is in the retracted position to drive the fastener so that is it flush (or counter sunk, depending on the nature of the material of the workpiece) or can be moved outwardly from the trigger enabling portion 62 into any one of a multiplicity of adjusted operating positions to hold the end of the drive track 28 in spaced relation to the workpiece surface to partially drive the nail into the workpiece a desired predetermined distance.

Figure 10:
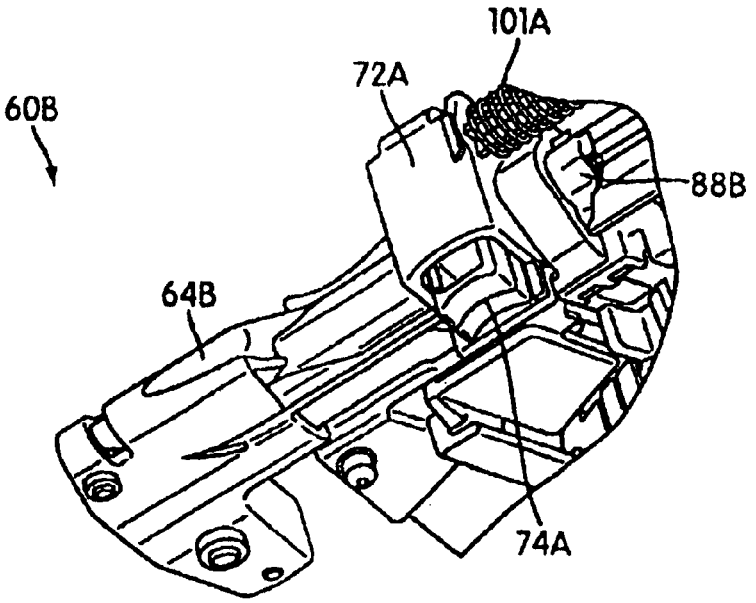
FIGS. 10 and 11 are fragmentary views of an exemplary workpiece engaging portion of the safety trip assembly that includes a positioning mechanism constructed and arranged to position the nosepiece structure into an opening in a workpiece.
Figure 11:
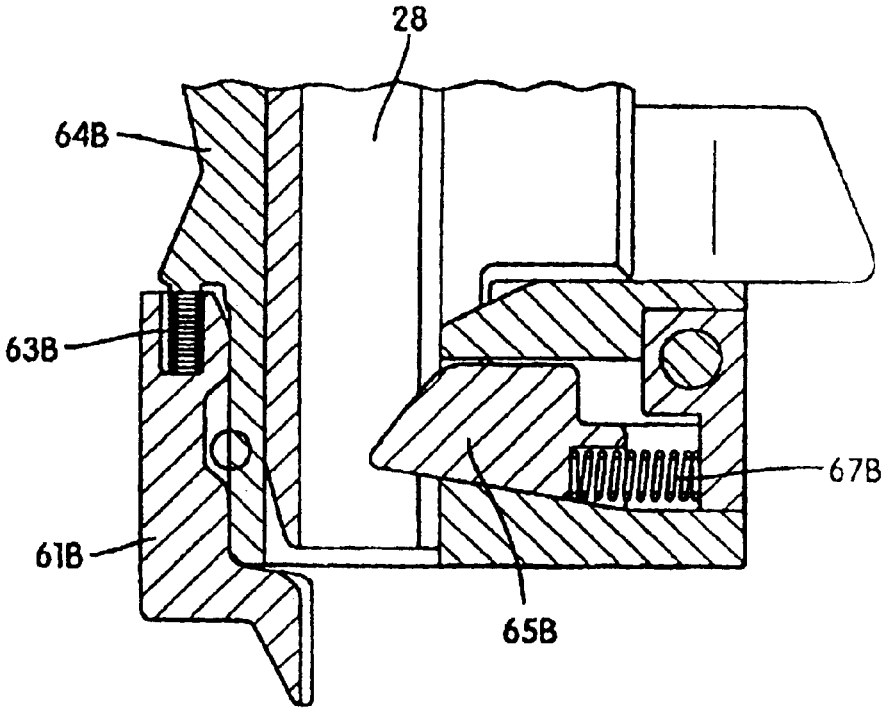
Figure 12:
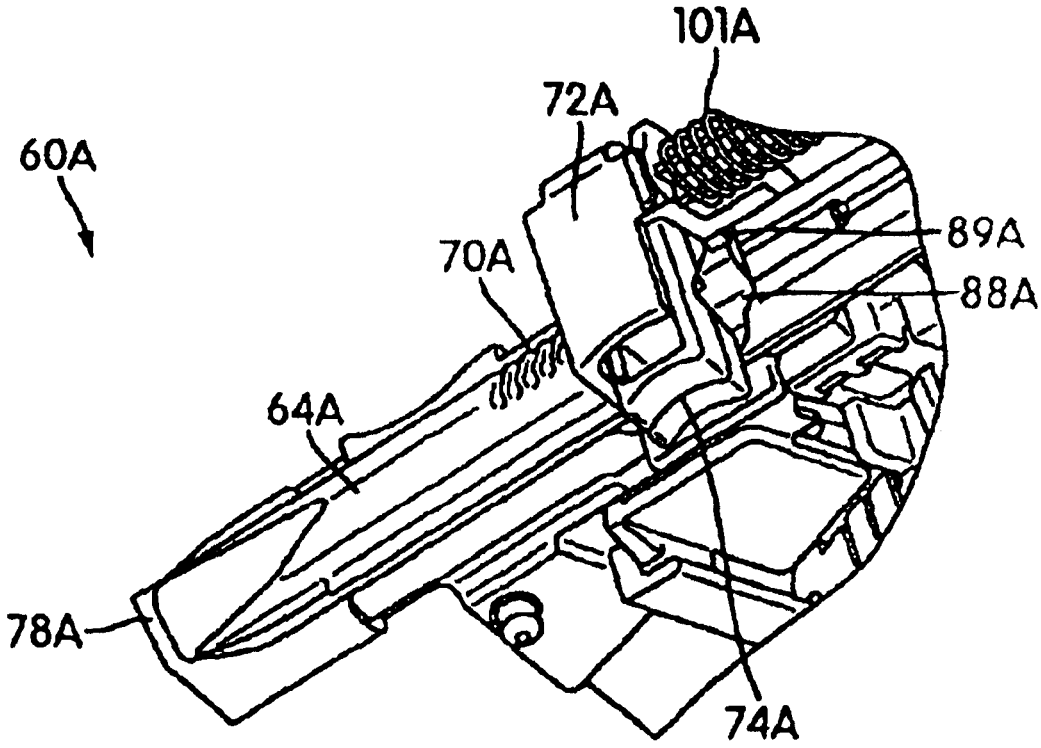
FIG. 12 PRIOR ART
FIG. 12 is a fragmentary view of a workpiece engaging portion of a safety trip assembly according to the prior art.

Referring to FIGS. 10 and 11, an embodiment of an alternate preferred workpiece engaging portion 64B for use with a safety trip assembly 60B of the fastener driving tool 10 according to the present invention includes a positioning mechanism constructed and arranged to position the nosepiece assembly into an opening in a first workpiece such that the fastener is driven through the opening to fasten the first workpiece to a second workpiece. The positioning mechanism includes an opening locating structure 61 movably connected to the safety trip assembly 60B and adapted to extend into the opening to align the nosepiece assembly with respect to the opening. The opening locating structure 61 is movable relative to the safety trip assembly 60B between an extended position by a first biasing spring 63 to facilitate locating of the opening, and movable to a retracted position when the opening locating structure 61 is pressed against the first workpiece. The positioning mechanism further includes a guiding structure 65 movably connected to the nosepiece assembly, the guiding structure 65 being biased by a second spring 67 to extend forwardly to guide the fastener in the drive track 28. The workpiece engaging portion 64B of FIGS. 10 and 11 that is usable with the present invention is disclosed in more detail in commonly assigned, co-pending U.S. application Ser. No. 10/244,597, filed Sep. 17, 2002, the entire contents of which are incorporated herein by reference. It should be appreciated that other workpiece engaging portions can also be employed, and the ease of removability of the workpiece engaging portion enables the same tool to be readily adapted for different applications.

It also enables quick replacement of a damaged workpiece engaging portion with a new one. As shown in FIG. 10, the workpiece engaging portion 64B does not include a retaining projection near its proximal end 88B. The workpiece engaging portion 64B is removable from the safety trip assembly 601 and may be exchanged with another workpiece engaging portion, such as the workpiece engaging portion 64. The fastener driving tool 10 may then be used with different workpiece engaging portions, which increases the versatility of the fastener driving tool 10.

It can be understood that the embodiments of the fastener driving tool 10 shown and described are exemplary only and not intended to limit the scope of the invention. It will be understood, for example, that the trigger mechanism 37 and the safety trip assembly 60 cooperate to actuate the actuating valve 36 and begin the device cycle regardless of whether the safety trip assembly 60 is moved into its retracted position first and the trigger member is moved rearwardly to its actuated position thereafter or whether the trigger member is moved rearwardly to its actuated position and then the safety trip assembly 60, 60B is moved to its retracted position thereafter. It can be understood that it is within the scope of the present invention to provide a manual actuating mechanism that incorporates the releasable coupling mechanism 66 that requires a particular sequence of movements as, for example, an initial movement of the safety trip assembly 60, 60B into its operative position and then the digital movement of the trigger member to its actuated position.

One skilled in the art will understand that a releasable coupling mechanism constructed according to the principles of the present invention can be incorporated into a wide range of safety trip assemblies that can be used on a wide range of power operated fastener driving devices.

It can also be appreciated that the type of fastener driven by the tool 10 and the size thereof can vary widely. It is also understood that the manner in which the fasteners are releasably secured to one another is entirely conventional. The fasteners 40 shown are flathead nails that are packaged in straight stick form and may be of the type which include notched heads enabling the shanks of the nails to be disposed in a shank-to-shank abutting stick and secured thereto by a pair of wires suitably welded to one side of the shanks. It will be understood that the invention has wide applicability in power operated fastener driving devices that include straight magazine and pushers or other conventional feeding mechanisms that are movably mounted within the magazine. It will also be understood that while the present device is particularly useful in large size pneumatic fastener driving devices, the invention can be applied to devices where fastener drivers are of a lesser size. It can also be understood that the invention is not restricted to pneumatically powered devices and can be included in other power operated devices of the fluid pressure operated type including those powered by internal combustion. The driver may also be driven electromagnetically in other embodiments of the invention.

What is claimed is:

1. A fastener driving tool for driving fasteners into a workpiece, comprising:

a housing assembly including a nosepiece assembly defining a longitudinally-extending fastener drive track;

a fastener driving mechanism carried internally of the housing assembly and constructed and arranged to drive a fastener through the fastener drive track and into a workpiece when the fastener drive mechanism is selectively activated by a user;

a manually actuatable trigger mechanism constructed and arranged to activate the fastener driving mechanism when manually actuated by a user; and a safety trip assembly including a trigger enabling portion and a workpiece engaging portion slidably mounted to the trigger enabling portion for rectilinear sliding movement in a longitudinal direction relative to the trigger enabling portion;

a manually operable locking mechanism including a manually-operable, movable locking member mounted to the trigger enabling portion for movement between a locking position and a releasing position, the movable locking member in the locking position thereof engaging the workpiece engaging portion to releasably couple the workpiece engaging portion to the trigger enabling portion and thereby fix a longitudinal length of the safety trip assembly, the movable locking member in the releasing position thereof being disengaged from the workpiece engaging portion to enable the workpiece engaging portion to be slid rectilinearly in the longitudinal direction relative to the trigger enabling portion for adjusting the longitudinal length of the safety trip assembly and for optionally removing the workpiece engaging portion from the safety trip assembly; and a spring biasing the movable locking member into the locking position, the spring permitting the movable locking member to be manually moved to the releasing position against the biasing force by a user's hand engaging the movable locking member to move the movable locking member from the locking position to the releasing position and to automatically return to the locking position when the movable locking member is disengaged by the user's hand.

2. A fastener driving tool according to claim 1, wherein the workpiece engaging portion comprises a positioning mechanism constructed and arranged to position the nosepiece assembly into an opening in a first workpiece such that the fastener is driven through the opening to fasten the first workpiece to a second workpiece.

3. A fastener driving tool according to claim 2, wherein the positioning mechanism further includes a guiding structure movably connected to the nosepiece assembly, the guiding structure being biased by a spring to extend forwardly to guide the fastener in the drive track.

4. A fastener driving tool according to claim 1, wherein the workpiece engaging portion comprises an opening locating structure movably connected to the safety trip assembly and adapted to extend into an opening in a workpiece to align the nosepiece assembly with respect to the opening, the opening locating structure being movable relative to the safety trip assembly between an extended position by a first biasing spring to facilitate locating of the opening, and movable to a retracted position when the opening locating structure is pressed against the workpiece.

5. A fastener driving tool according to claim 1, wherein the workpiece engaging portion further comprises rearwardly extending wall structures integrally formed on a distal end of the workpiece engaging portion and surrounding at least a portion of a distal end portion of the nosepiece assembly, such that the workpiece engaging portion is movably mounted on the nosepiece assembly so as to allow longitudinal movement of the workpiece engaging portion with respect to the nosepiece assembly.

6. A fastener driving tool according to claim 1, wherein the spring is a coil spring.

7. A fastener driving tool according to claim 1, wherein the movable locking member is mounted to the trigger enabling portion for transverse movement relative to the longitudinal direction between the locking and releasing positions thereof and the spring is positioned to bias the movable locking member transversely to the locking position.

8. A fastener driving tool according to claim 1, wherein the movable locking member includes a locking member mounting structure provided on the trigger enabling portion, the locking member being movably mounted to the locking member mounting structure for movement between the locking and releasing positions.

9. A fastener driving tool according to claim 8, wherein the spring is mounted in compression between the locking member and a portion of the locking member mounting structure so as to bias the locking member into the locking position.

10. A fastener driving tool according to claim 1, wherein the workpiece engaging portion includes a series of teeth spaced apart in the longitudinal direction by grooves, the movable locking member in the locking position engaging the teeth to releasably couple the workpiece engaging portion to the trigger enabling portion and thereby fix the longitudinal length of the safety trip assembly, the movable locking member in the releasing position being disengaged from the teeth to enable the workpiece engaging portion to be slid rectilinearly in the longitudinal direction relative to the trigger enabling portion for adjusting the longitudinal position of the safety trip assembly and for removing the workpiece engaging portion from the safety trip assembly.

11. A fastener driving tool according to claim 10, wherein the movable locking member has teeth and grooves on angled, longitudinally extending wall portions thereof and the teeth and grooves on the workpiece engaging portion are formed on an angled, longitudinally extending wall structure of the workpiece engaging portion.

12. A method for exchanging different workpiece engaging portions of a safety trip assembly in a fastener driving tool for driving fasteners into a workpiece, the safety trip assembly including a trigger enabling portion and a selected workpiece engaging portion, the selected workpiece engaging portion slidably mounted to the trigger enabling portion for movement in a longitudinal direction relative to the trigger enabling portion, the safety trip assembly being movable when the selected workpiece engaging portion is releasably coupled to the trigger enabling portion between an extended position and a retracted position whereby the trigger enabling portion enables the trigger mechanism to activate the fastener driving mechanism when manually actuated by a user when the safety trip assembly is in the retracted position and disables the trigger mechanism when the safety trip assembly is not in the retracted position; the method comprising:

manually engaging and moving a manually-operable, movable locking member and mounted to the trigger enabling portion against a biasing of a spring from a locking position wherein the locking member lockingly engages a first selected workpiece engaging portion to releasably couple the first selected workpiece engaging portion to the trigger enabling portion to a releasing position wherein the locking member is disengaged from the first selected workpiece engaging portion;

while the locking member is in the releasing position thereof, moving the first selected workpiece engaging portion relative to the trigger enabling portion until the first selected workpiece engaging portion is removed from the safety trip assembly, and moving a second selected workpiece engaging portion different from the first selected workpiece engaging portion relative to the trigger enabling portion so that the second selected workpiece engaging portion is mounted to the trigger enabling portion;

manually releasing the locking member to allow the spring to bias the movable locking member from the releasing position back into the locking position to thereby lockingly engage the second selected workpiece engaging portion.

13. A method according to claim 12, wherein the movable locking member is mounted to the trigger enabling portion for transverse movement relative to the longitudinal direction between the locking and releasing positions thereof and wherein the spring is positioned to bias the locking member transversely to the releasing position thereof and wherein manually engaging and moving the locking member against the biasing of the spring from the locking position to the releasing position comprises manually engaging and moving the locking member transversely against the biasing of the spring from the locking position to the releasing position.

14. A method according to claim 12, wherein a locking member mounting structure is provided on the trigger enabling portion, wherein the locking member is movably mounted to the locking member mounting structure for movement between the locking and releasing positions thereof, and wherein the spring is mounted in compression between the locking member and a portion of the locking member mounting structure so as to bias the locking member into the locking position and wherein manually engaging and moving the locking member against the biasing of the spring from the locking position to the releasing position comprises manually engaging and moving the locking member to compress the spring.

15. A method according to claim 12, wherein the first and second workpiece engaging portions each include a series of teeth spaced apart in the longitudinal direction by grooves and wherein manually engaging and moving the locking member against the biasing of the spring from the locking position to the releasing position comprises manually engaging the locking member from the locking position thereof engaging the teeth to releasably couple the first or second selected workpiece engaging portion to the trigger enabling portion to the releasing position thereof disengaging from the teeth to enable the first or second selected workpiece engaging portion to be slid rectilinearly in the longitudinal direction relative to the trigger enabling portion.

16. A method according to claim 12, wherein the second workpiece engaging portion comprises a positioning mechanism constructed and arranged to position the nosepiece assembly into an opening in a first workpiece such that the fastener is driven through the opening to fasten the first workpiece to a second workpiece.

17. A method according to claim 16, wherein the positioning mechanism further includes a guiding structure movably connected to the nosepiece assembly, the guiding structure being biased by a spring to extend forwardly to guide the fastener in the drive track.

18. In combination:

a fastener driving tool adapted to be used with different workpiece engaging portions, the fastener driving tool comprising:

a housing assembly including a nosepiece assembly defining a longitudinally-extending fastener drive track;

a fastener driving mechanism carried internally of the housing assembly and constructed and arranged to drive a fastener through the fastener drive track and into a workpiece when the fastener drive mechanism is selectively activated by a user;

a manually actuatable trigger mechanism constructed and arranged to activate the fastener driving mechanism when manually actuated by a user; and a safety trip assembly including a trigger enabling portion and a first workpiece engaging portion movably mounted to the trigger enabling portion for movement in a longitudinal direction relative to the trigger enabling portion;

a manually operable locking mechanism including a manually-operable, movable locking member mounted to the trigger enabling portion for movement between a locking position and a releasing position, the movable locking member in the locking position thereof engaging the first workpiece engaging portion to releasably couple the first workpiece engaging portion to the trigger enabling portion and thereby fix a longitudinal length of the safety trip assembly, the movable locking member in the releasing position thereof being disengaged from the first workpiece engaging portion to enable the first workpiece engaging portion to be moved in the longitudinal direction relative to the trigger enabling portion for adjusting the longitudinal length of the safety trip assembly, said movable locking member in said releasing position thereof enabling the first workpiece engaging portion to be removed from the safety trip assembly; and a spring biasing the movable locking member into the locking position, the spring permitting the movable locking member to be manually moved to the releasing position against the biasing force by a user's hand engaging the movable locking member to move the movable locking member from the locking position to the releasing position and to automatically return to the locking position when the movable locking member is disengaged by the user's hand; and a second workpiece engaging portion being mountable to the trigger enabling portion after said first workpiece engaging portion has been removed, said movable locking member being engageable with the second workpiece engaging portion to releasably couple the second workpiece engaging portion to the trigger enabling portion, the second workpiece engaging portion comprising a positioning mechanism constructed and arranged to position the nosepiece assembly into an opening in a first workpiece such that the fastener is driven through the opening to fasten the first workpiece to a second workpiece.

19. A combination according to claim 18, wherein the positioning mechanism further includes a guiding structure movably connected to the nosepiece assembly, the guiding structure being biased by a spring to extend forwardly to guide the fastener in the drive track.

20. A combination according to claim 18, wherein the first and second workpiece engaging portions each include a series of teeth spaced apart in the longitudinal direction by grooves, the movable locking member in the locking position engaging the teeth to releasably couple the first or second workpiece engaging portion to the trigger enabling portion and thereby fix the longitudinal length of the safety trip assembly, the movable locking member in the releasing position being disengaged from the teeth to enable the first or second workpiece engaging portion to be moved in the longitudinal direction relative to the trigger enabling portion for adjusting the longitudinal length of the safety trip assembly and for removing the first or second workpiece engaging portion from the safety trip assembly.

*21. A fastener driving tool for driving fasteners into a workpiece, comprising:*

*a housing assembly including a nosepiece assembly defining a longitudinally-extending fastener drive track;*

*a fastener driving mechanism carried by the housing assembly and constructed and arranged to drive a fastener through the fastener drive track and into a workpiece when the fastener drive mechanism is selectively activated by a user;*

*a manually actuatable trigger mechanism constructed and arranged to activate the fastener driving mechanism when manually actuated by a user; and*

*a safety trip assembly, which when activated, enables operation of the trigger mechanism, said safety trip assembly including a trigger enabling portion and a workpiece engaging portion;*

*a manually operable locking mechanism including a manually-operable, movable locking member mounted for movement between a locking position and a releasing position, the movable locking member in the locking position thereof releasably coupling the workpiece engaging portion to the trigger enabling portion and thereby fix a longitudinal length of the safety trip assembly, the movable locking member in the releasing position thereof enabling the workpiece engaging portion to be slid rectilinearly in the longitudinal direction relative to the trigger enabling portion for adjusting the longitudinal length of the safety trip assembly and for optionally removing the workpiece engaging portion from the safety trip assembly; and*

*a spring that releasably retains the movable locking member in the locking position, the spring permitting the movable locking member to be manually moved to the releasing position by a user's hand engaging the movable locking member to move the movable locking member from the locking position to the releasing position.*

*22. A fastener driving tool for driving fasteners into a workpiece, comprising:*

*a housing assembly including a nosepiece assembly defining a longitudinally-extending fastener drive track;*

*a fastener driving mechanism carried by the housing assembly and constructed and arranged to drive a fastener through the fastener drive track and into a workpiece when the fastener drive mechanism is selectively activated by a user;*

*a manually actuatable trigger mechanism constructed and arranged to activate the fastener driving mechanism when manually actuated by a user; and*

*a safety trip assembly, which when activated, enables operation of the trigger mechanism, said safety trip assembly including a trigger enabling portion and a workpiece engaging portion; and*

*a manually operable locking mechanism including a manually-operable, movable locking member mounted for movement between a locking position and a releasing position, the movable locking member in the locking position thereof releasably coupling the workpiece engaging portion to the trigger enabling portion and thereby fix a longitudinal length of the safety trip assembly, the movable locking member in the releasing position thereof enabling the workpiece engaging portion to be slid rectilinearly in the longitudinal direction relative to the trigger enabling portion for adjusting the longitudinal length of the safety trip assembly and for optionally removing the workpiece engaging portion from the safety trip assembly,*

*said manually operated locking mechanism remaining connected with the safety trip assembly when removing the workpiece engaging portion from the safety trip assembly.*

*23. A fastener driving tool for driving fasteners into a workpiece, comprising:*

*a housing assembly including a nosepiece assembly defining a longitudinally-extending fastener drive track;*

*a fastener driving mechanism carried by the housing assembly and constructed and arranged to drive a fastener through the fastener drive track and into a workpiece when the fastener drive mechanism is selectively activated by a user;*

*a manually actuatable trigger mechanism constructed and arranged to activate the fastener driving mechanism when manually actuated by a user; and*

*a safety trip assembly, which when activated, enables operation of the trigger mechanism, said safety trip assembly including a trigger enabling portion and a workpiece engaging portion; and*

*a manually operable locking mechanism including a manually-operable, movable locking member mounted for movement between a locking position and a releasing position, the movable locking member in the locking position thereof releasably coupling the workpiece engaging portion to the trigger enabling portion and thereby fix a longitudinal length of the safety trip assembly, the movable locking member in the releasing position thereof enabling the workpiece engaging portion to be slid rectilinearly in the longitudinal direction relative to the trigger enabling portion for adjusting the longitudinal length of the safety trip assembly and for optionally removing the workpiece engaging portion from the safety trip assembly,*

*said manually operable locking mechanism having a manually engageable surface portion, which when manually depressed, moves the locking mechanism to the releasing position.*

* * * * *